United States Patent
Sato

(10) Patent No.: US 8,586,136 B2
(45) Date of Patent: Nov. 19, 2013

(54) METHOD OF MANUFACTURING MAGNETIC RECORDING MEDIUM AND MAGNETIC RECORDING MEDIUM MANUFACTURED USING THE SAME

(75) Inventor: Narumi Sato, Minami-Alps (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 76 days.

(21) Appl. No.: 13/104,930

(22) Filed: May 10, 2011

(65) Prior Publication Data

US 2012/0045663 A1 Feb. 23, 2012

(30) Foreign Application Priority Data

Aug. 17, 2010 (JP) ................................ 2010-182372

(51) Int. Cl.
*G11B 5/84* (2006.01)
*G11B 5/74* (2006.01)

(52) U.S. Cl.
USPC ........... 427/130; 427/127; 427/128; 427/131; 427/372.2

(58) Field of Classification Search
None
See application file for complete search history.

(56) References Cited

U.S. PATENT DOCUMENTS

| 6,168,831 B1 * | 1/2001 | Khan et al. ................ 427/240 |
| 6,355,342 B1 * | 3/2002 | Chen ............................ 428/332 |
| 6,950,253 B2 * | 9/2005 | Wang et al. .................... 360/17 |
| 2004/0053042 A1 * | 3/2004 | Eguchi ........................ 428/327 |
| 2006/0135042 A1 * | 6/2006 | Frost et al. ...................... 451/5 |
| 2007/0291410 A1 * | 12/2007 | Oka ............................ 360/126 |
| 2010/0103556 A1 * | 4/2010 | Suzuki et al. .............. 360/97.02 |

FOREIGN PATENT DOCUMENTS

| JP | 03-268223 | | 11/1991 | |
| JP | 2002-224966 | | 8/2002 | |
| JP | 2003-006849 | * | 1/2003 | ............. G11B 5/84 |
| JP | 2003-085747 A | | 3/2003 | |

* cited by examiner

*Primary Examiner* — Timothy Meeks
*Assistant Examiner* — Mandy Louie
(74) *Attorney, Agent, or Firm* — Rabin & Berdo, P.C.

(57) ABSTRACT

A method of manufacturing a magnetic recording medium with high recording density and enabling stable flight of a magnetic head, with high manufacturing yields, is provided. The method includes layering a magnetic layer, a protective layer, and a lubricating layer in order on a substrate, and forming a medium for transfer. The method further includes transferring a magnetic pattern to the medium for transfer, and flattening a surface of the lubricating layer of the medium for transfer for which the magnetic pattern transferring is completed. The surface of the lubricating layer is flattened either by wiping the surface of the lubricating layer using a member without a cutting effect, or by heating the surface of the lubricating layer.

19 Claims, 11 Drawing Sheets

METHOD OF MANUFACTURING MAGNETIC RECORDING MEDIUM AND MAGNETIC RECORDING MEDIUM MANUFACTURED USING THE SAME

CROSS-REFERENCE TO RELATED APPLICATION

This application claims priority under 35 U.S.C. §119 from Japanese Patent Application No. 2010-182372, filed on Aug. 17, 2010, the entirety of which is incorporated herein by reference.

BACKGROUND OF THE INVENTION

1. Field of the Invention

This invention relates to a method of manufacturing a magnetic recording medium. In particular, this invention relates to a method of manufacturing a magnetic recording medium used in a hard disk drive and similar. This invention further relates to a magnetic recording medium manufactured using this method of manufacture.

2. Description of the Related Art

As the present state of magnetic information writing onto a magnetic recording medium, after a magnetic recording medium on which no magnetic information is written is incorporated into a hard disk drive (HDD) device, necessary magnetic information is written onto the magnetic recording medium in the HDD in concentric-shape regions having a constant width, called tracks.

Further, data reading and writing is performed while the magnetic head moves along a track on the magnetic recording medium. At this time, the magnetic head detects positional shifts from the track through magnetic signals, called servo signals, written in the magnetic recording medium, and is controlled so as not to deviate from the track.

In order to write servo signals precisely in concentric shapes on a magnetic recording medium on which nothing is written, there is a method of inserting a device having a precise position control function into each HDD from the outside. However, in this method several hours are required to write magnetic information onto tracks numbering several hundred thousand. And, increases in recording density have been accompanied by the need for higher-precision position control devices and for longer write times. Hence the method of inserting a position control device from the outside for each HDD has major disadvantages with respect to productivity and cost.

On the other hand, a magnetic transfer technology and device have been developed by which a transfer master disc having a servo signal pattern is placed in close contact with a magnetic recording medium, and by applying a magnetic field from the outside, the servo signal pattern is instantaneously transferred to the magnetic recording medium.

However, if anomalous protrusions exist in the surface of the magnetic recording medium, when the transfer master disc and the magnetic recording medium are brought into close contact, there may be cases in which the protrusions are collapsed and new protrusions appear in the vicinity thereof, and moreover the protrusions are crushed so that numerous minute protrusions remain over a wide range. If these protrusions exist in the surface of the magnetic recording medium, the protrusions may come into contact with a magnetic head in the HDD, exerting an adverse effect on the head flight.

Hence as for example described in Japanese Patent Publication No. 3587464, after magnetic transfer the magnetic recording medium is subjected to burnishing treatment, and protrusions are cut away and removed.

In recent years, HDD recording capacities have continued to increase, and recording densities of magnetic recording media have also further increased. In order to record on media with such high recording densities, the flying heights of magnetic heads have been steadily lowered, and there have been mounting demands for a smaller distance between the magnetic head and the recording layer of the magnetic recording medium (hereafter also called the magnetic spacing). FIG. 1A shows an example of a conventional magnetic recording medium, i.e., disc-shaped magnetic recording media 100. FIG. 1B, which is a cross-section along A-A' in FIG. 1A, shows that this structure is generally a layering in succession on a substrate 102 of a magnetic layer 104, a protective layer 106, and a lubricating layer 108.

Hence as means of reducing the magnetic spacing, reduction of the surface roughness of the magnetic recording medium 100, and reduction of the thicknesses of the protective layer 106 and lubricating layer 108 formed on the magnetic layer 104, are conceivable.

In a magnetic recording medium in which the magnetic spacing is reduced in this way, if in the surface there exist minute protrusions and scratches, which previously had not posed problems, then such problems as reduced flying stability of the magnetic head and lowered product manufacturing yields occur, and so a still higher level of flatness is demanded for the surfaces of magnetic recording media.

In light of such circumstances, when employing a method such as that described in Japanese Patent Publication No. 3587464 in which, after magnetic transfer, a magnetic recording medium is subjected to burnishing, and protrusions existing on the medium surface are cut away and removed, the following problem may occur.

When applying a burnishing head for burnishing, there exists certain possibility of contact between the burnishing head and the magnetic recording medium. If the contact occurs, scratches may occur in the medium surface. Thus, the flying stability of a magnetic head may be reduced.

Further, when using burnishing tape in which aluminum oxide abrasive particles are bound to a base film for burnishing, abrasive particles on the burnishing tape may become separated, and the separated particles may be dragged during treatment to cause scratches on the surface of the magnetic recording medium. Thus, the flying stability of a magnetic head may be reduced.

In addition to burnishing after magnetic transfer, there exists another possible cause of reduced flying stability of a magnetic head. When a transfer master disc and magnetic recording medium are brought into close contact in a process of magnetic transfer, mutual transfer to the opposing surface of a lubricating layer between the master disc and the medium. This lubricating layer transfer may cause unevenness in the lubricating layer surface of the magnetic recording medium after magnetic transfer (micro-unevenness of the lubricating layer surface), which may have adverse effects on the flying stability of a magnetic head.

The burnishing performed after magnetic transfer not only adversely affects the flying characteristics of the magnetic head, but may also adversely affect the burnishing head flight and the manner of application of burnishing tape. That is, in the latest magnetic recording media with high recording densities, the surface roughness is small compared with previous magnetic recording media, and so the friction force on the protective layer is high in portions where the lubricating layer is lacking, and the protective layer itself is also thinner, so that unevenness in the surface of the lubricating layer occurring at the time of magnetic transfer can be a cause of more readily occurring scratches in the magnetic recording medium surface during burnishing performed after magnetic transfer.

SUMMARY OF THE INVENTION

Hence an object of this invention is to provide a method of manufacturing a magnetic recording medium including a magnetic transfer process, more specifically, a method of manufacture with a high manufacturing yield, which produces magnetic recording media with high recording densities and enabling stable flight of magnetic heads.

This invention relates to a method of manufacturing a magnetic recording medium including the steps of: 1) layering a magnetic layer, a protective layer, and a lubricating layer in order on a substrate, and forming a medium for transfer; 2) transferring a magnetic pattern to the medium for transfer; and 3) flattening a surface of the lubricating layer of the medium for transfer for which the transfer is completed, wherein means for flattening the surface of the lubricating layer wipes the surface of the lubricating layer using a member without a cutting effect, or heats the surface of the lubricating layer.

In a method of this invention, it is preferable that the member without a cutting effect comprises woven cloth or unwoven cloth. Further, it is preferable that the member without a cutting effect comprises wiping film in which minute particles are bonded onto a film base by a bonding agent.

It is preferable that a method of this invention further includes a step of inspecting a surface smoothness of the medium for transfer between step 1) and step 2). Further, it is preferable that the step of inspecting a surface smoothness of the medium for transfer is performed by a glide test.

It is preferable that a method of this invention further includes a step of burnishing the medium for transfer after step 3).

In a method of this invention, it is preferable that the protective layer of the medium for transfer formed in step 1) has a thickness of 3.0 nm or less. Further, it is preferable that the lubricating layer of the medium for transfer formed in step 1) has a thickness of 1.5 nm or less. And, it is preferable that the medium for transfer formed in step 1) has a surface roughness Ra of 0.5 nm or less.

This invention includes a magnetic recording medium manufactured using a method of manufacturing a magnetic recording medium described above.

By means of a method of manufacturing of this invention, a magnetic recording medium having excellent surface smoothness and high recording density can be manufactured. Hence it is possible to provide, with high manufacturing yield, a magnetic recording medium with a high recording density and enabling stable magnetic head flight.

BRIEF DESCRIPTION OF THE DRAWINGS

FIG. 2A shows a process of layering in order on a substrate a magnetic layer, protective layer, and lubricating layer.

FIG. 2B shows a process of transferring a magnetic pattern to a medium for transfer.

FIG. 2C shows a process of flattening by wiping the lubricating layer surface using a member without a cutting effect.

FIG. 2D shows a process of flattening by heating the lubricating layer surface.

FIG. 3A schematically shows a medium for transfer set in a glide testing apparatus.

FIG. 3B shows a state of inspecting the surface smoothness of the medium for transfer using the glide testing apparatus.

FIG. 3C is shows the results of analysis of the surface smoothness of the medium for transfer inspected using the glide testing apparatus.

DESCRIPTION OF THE PREFERRED EMBODIMENTS

FIGS. 2A to 2D collectively explain processes in the manufacture of a magnetic recording medium of this invention.

Figure 1A:
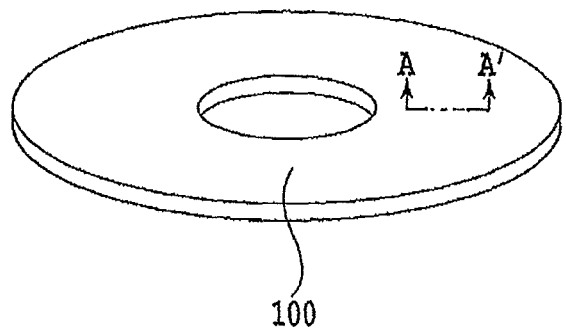
FIG. 1A shows a conventional disc-shape magnetic recording media.
Figure 1B:
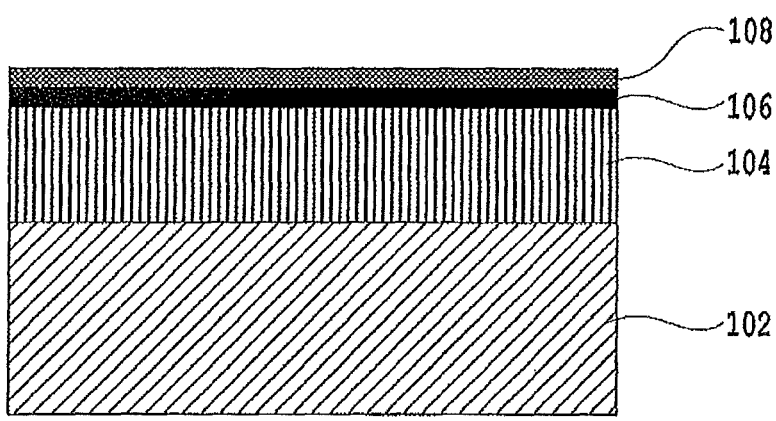
FIG. 1B is a cross-section along A-A' in FIG. 1A.
Figure 2A:
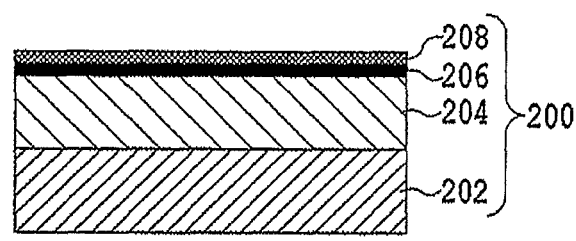
FIGS. 2A to 2D collectively explain processes in the manufacture of a magnetic recording medium of this invention.

FIG. 2A shows a process 1) of layering in order on a substrate a magnetic layer, protective layer, and lubricating layer.

Figure 2B:
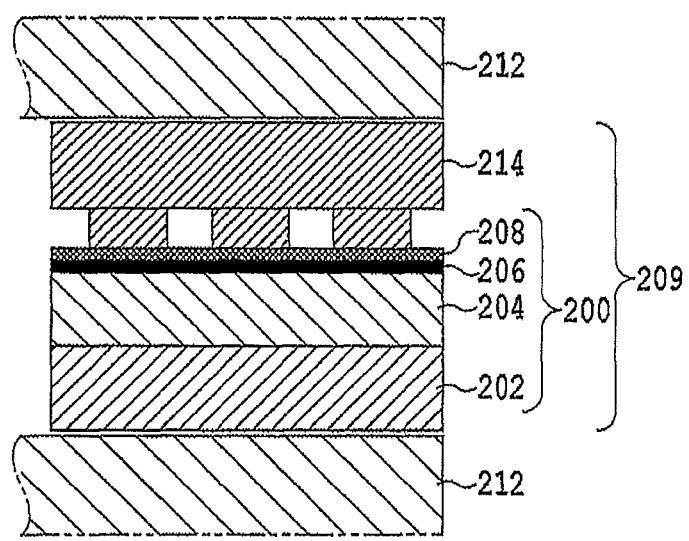

FIG. 2B shows a process 2) of transferring a magnetic pattern to a medium for transfer.

Figure 2C:
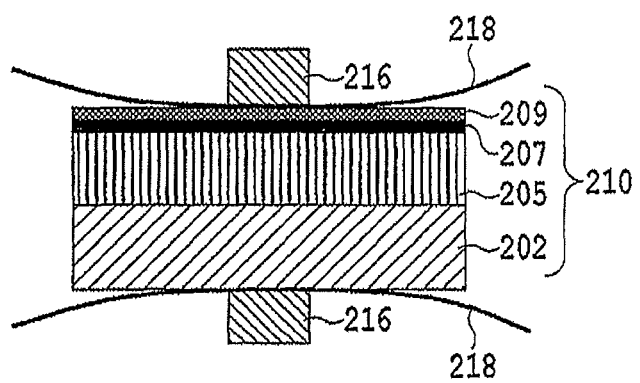

FIG. 2C shows a process 3) of flattening the surface of the lubricating layer of the medium for transfer after the transfer, in which the lubricating layer surface is flattened by wiping the lubricating layer surface using a member without a cutting effect.

Figure 2D:
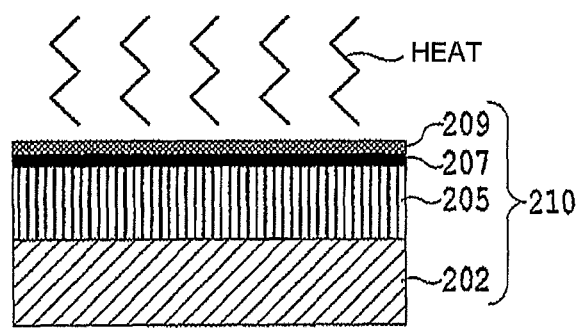

FIG. 2D shows a process 3) of flattening the surface of the lubricating layer of the medium for transfer after the transfer, in which the lubricating layer surface is flattened by heating the lubricating layer surface.

Each of the above processes 1) to 3) is explained in detail below.

1) Process of Layering in Order on a Substrate a Magnetic Layer, Protective Layer, and Lubricating Layer, and Forming a Medium for Transfer (FIG. 2A)

As shown in FIG. 2A, process 1) is a process of layering in order, on a substrate 202, a magnetic layer 204, protective layer 206, and lubricating layer 208, and forming a medium for transfer 200. Methods used in the manufacture of conventional magnetic recording media can be applied. The protective layer 206 is a layer which, when a magnetic head flying above the magnetic recording medium makes contact with the magnetic recording medium due to some problem, protects the magnetic layer 204 from the shock. Further, the lubricating layer 208 is provided to enable the magnetic head to fly smoothly and stably above the magnetic recording medium.

The magnetic layer 204 can be formed on the substrate 202 using a sputtering method, a vacuum evaporation deposition method, or another arbitrary method known in the art.

The protective layer 206 can be formed using a general CVD method, sputtering method, vacuum evaporation deposition method, or similar.

The lubricating layer 208 can be formed by using a dipping method, spin coating method, or other arbitrary method known in the art to apply a liquid lubricant and then perform drying. It is preferable that drying is performed by heating.

Due to drying, the viscosity of the applied liquid lubricant declines, and liquid lubricant flows to portions of the surface of the protective layer 206 which had not been covered by the liquid lubricant, so that the liquid lubricant is distributed uniformly over the protective layer 206. Further, heating intensifies the bonding force between the lubricating layer 208 and the protective layer 206, and also prevents interlayer separation of the lubricating layer 208.

Conditions of formation of each of these films may differ depending on the materials used, and conditions disclosed for methods of manufacturing conventional magnetic recording media may be applied.

Below, the materials and similar used in this process for each layer are explained.

(Substrate)

No limitations in particular are imposed on the substrate 202, so long as a material used in magnetic recording media of the prior art is used. Materials, such as glass, aluminum, ceramics, plastics and similar, may be used.

(Magnetic Layer)

No limitations in particular are imposed on the magnetic layer 204, so long as a material used in magnetic recording media of the prior art is used. For example, the magnetic layer 204 can be formed using an alloy material of CoPt, CoCrPt, CoCrPtB, CoCrPtTa, or similar. Further, material having a granular structure, in which magnetic crystal grains are dispersed in a matrix of a nonmagnetic oxide or nonmagnetic nitride, may be used to form the magnetic layer. Materials having granular structures which can be used include CoPt—$SiO_2$, CoCrPtO, CoCrPt—$TiO_2$, CoCrPt—$SiO_2$, CoCrPt—$Al_2O_3$, CoPt—AlN, CoCrPt—$Si_3N_4$, and similar, but the material used is not limited to these.

The magnetic layer 204 may have a thickness used in ordinary magnetic recording media.

(Protective Layer)

The protective layer 206 can be formed using carbon (diamond-like carbon, amorphous carbon, or similar) or various thin layer materials known as materials for protective layers in magnetic recording media.

From the standpoint of improving productivity and raising the recording density, it is preferable that the thickness of the protective layer 206 be 3.0 nm or less. The thickness of the protective layer 206 can be determined by observation of the cross-section using a transmission electron microscope (TEM).

(Lubricating Layer)

As the material of the lubricating layer 208, a material ordinarily used in magnetic recording media can be employed. For example, a perfluoro polyether (PFPE) system liquid lubricant can be used.

From the standpoint of improving productivity and raising the recording density, it is preferable that the thickness of the lubricating layer 208 be 1.5 nm or less. The thickness of the lubricating layer 208 can be obtained by using a Fourier transform infrared (FT-IR) spectroscopy method to measure the magnetic recording medium without a lubricating layer in advance, and then measuring the magnetic recording medium having a lubricating layer, and taking the difference in the two values.

In order to reduce the magnetic spacing, it is preferable that the surface roughness Ra of the medium for transfer 200 be 0.5 nm or less. The surface roughness Ra of the medium for transfer 200 can be measured using an atomic force microscope (AFM). In this Specification, the surface roughness Ra of a medium for transfer means the surface roughness on the lubricating layer side of the medium for transfer.

In the above, the process 1) of layering, in order on a substrate, a magnetic layer, protective layer, and lubricating layer, and forming a medium for transfer, was explained; but a method of this invention may include a process of inspecting the surface smoothness of the medium for transfer. This process is explained below.

[Process of Inspecting Surface Smoothness of Medium for Transfer]

This process is a process of inspecting the surface smoothness of the medium for transfer. That is, in this process an inspection is performed to determine whether protrusions obstructing the stable flight of a magnetic head exist on the surface of the lubricating layer of the medium for transfer.

As the method of inspecting the surface smoothness of the medium for transfer, a method of the prior art can be employed, but a glide test may also be used. The glide test is explained, referring to FIGS. 3A to 3C.

Figure 3A:
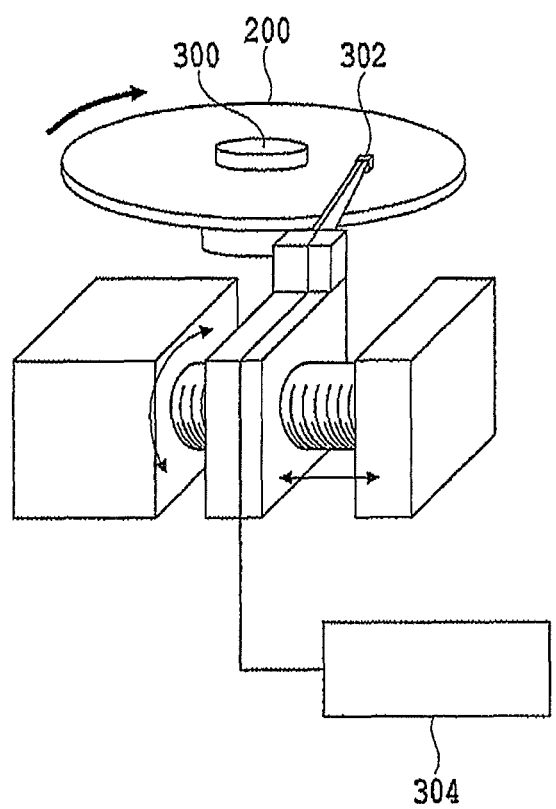
FIG. 3A to 3C collectively show a glide test performed in a process of inspecting surface smoothness in this invention.
Figure 3B:
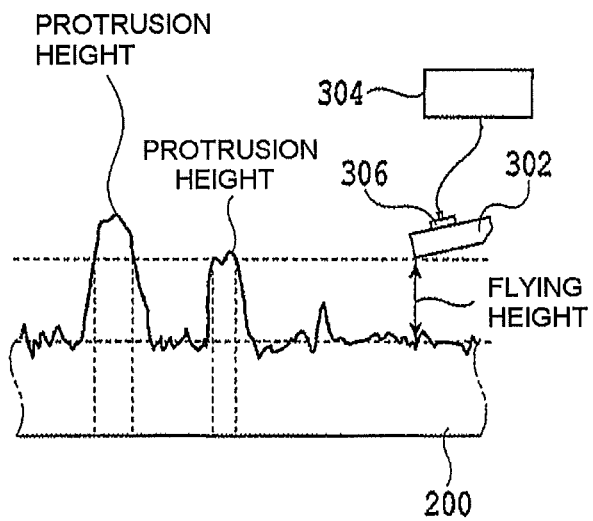
Figure 3C:
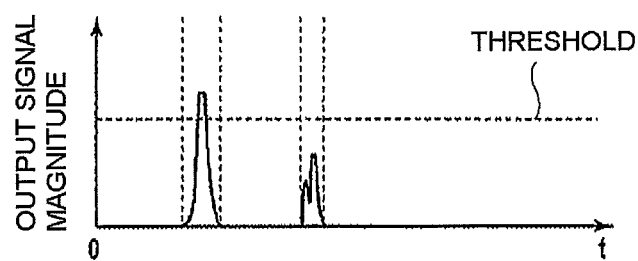

FIG. 3A schematically shows a medium for transfer 200 set in a glide testing apparatus. FIG. 3B is a conceptual diagram showing a state of inspecting the surface smoothness of the medium for transfer 200 using the glide testing apparatus. FIG. 3C is a conceptual diagram showing the results of analysis of the surface smoothness of the medium for transfer 200 inspected using the glide testing apparatus.

As shown in FIG. 3A, inspection of the surface smoothness of the medium for transfer is performed by setting the medium for transfer 200 on the spindle 300 of the glide testing apparatus such that the lubricating layer is uppermost, arranging the glide testing head 302 so as to maintain a prescribed flying height with respect to the surface of the medium for transfer 200, rotating the spindle 300, and reading out protrusions existing on the surface of the medium for transfer 200 using the glide testing head 302.

As shown in FIG. 3B, reading out of protrusions by the glide testing head 302 is performed when the height of protrusions is higher than the flying height of the glide testing head 302. When the glide testing head 302 makes contact with a protrusion and a shock wave occurs, signals are outputted to propagate to a sensor 306 provided on the glide testing head 302. The output signals are analyzed by a CPU 304 connected to the glide testing apparatus. Analysis results of the CPU 304 are displayed as output signals with magnitudes based on the magnitudes of shock waves occurring due to contact of the glide testing head 302 with protrusions, as shown in FIG. 3C. If signals of magnitude exceeding a prescribed threshold are detected at even one place within the surface of the medium for transfer 200, the medium for transfer 200 is judged to be defective.

Above, a process of inspecting the surface smoothness of a medium for transfer was explained. In this Specification, a medium for transfer, which has passed a test for inspecting smoothness, is also called a "testing-completed medium for transfer". In the succeeding processes 2) and 3), testing-completed media for transfer may be used, or media for transfer which have not been subjected to this inspection process may be used.

2) Process of Transferring a Magnetic Pattern to a Medium for Transfer (FIG. 2B)

The process 2) is a process of transferring a magnetic pattern to the medium for transfer 200 formed in the above process 1). A method employed in manufacture of conventional magnetic recording media can be applied.

FIG. 2B is a summary diagram showing the manner of transfer of a magnetic pattern to a medium for transfer 200 formed in process 1).

As shown in FIG. 2B, the magnetic pattern surface of the transfer master disc 214 is brought into close contact with the surface of the lubricating layer 208 of the medium for transfer 200, forming a close-contact member 209. Magnetic field generation means 212 are arranged, with a constant interval, on both outer surfaces of the close-contact member 209. Then, the magnetic field generation means 212 are operated, and by applying a magnetic field to the close-contact member 209, a magnetic pattern can be transferred from the transfer master disc 214 to the medium for transfer 200. After transfer of the magnetic pattern, the transfer master disc 214 and medium for transfer 200 are separated, and a medium for transfer with transfer completed is obtained.

No limitations in particular are imposed on the magnetic field generation means 212, so long as a magnetic field is generated appropriately. For example, magnets or similar can be used.

Figure 4:
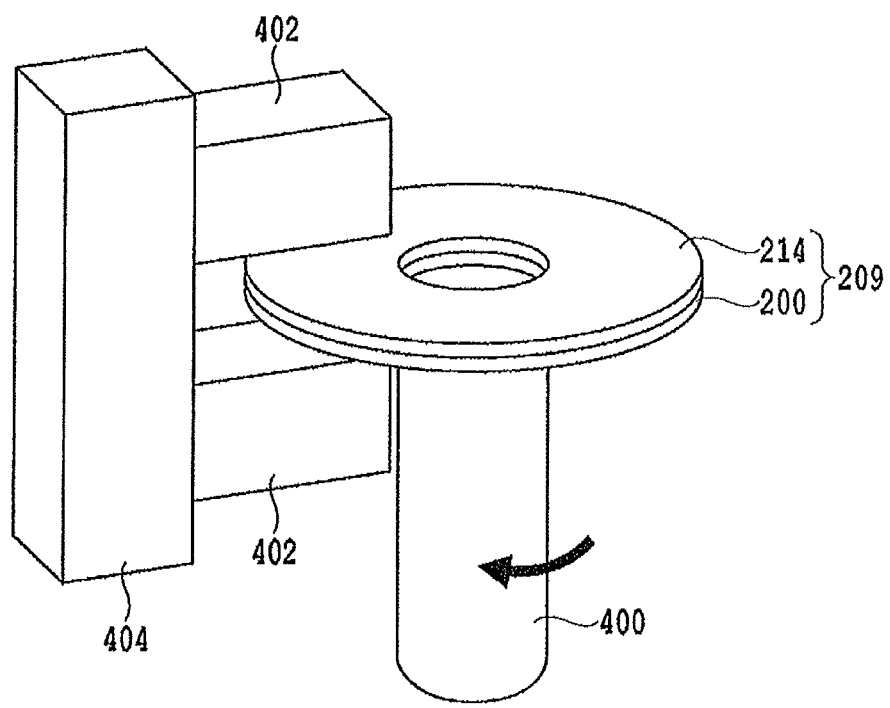
FIG. 4 shows an example of a magnetic transfer device used in a transfer process of this invention.

In order to transfer a magnetic pattern from the transfer master disc 214 to the medium for transfer 200, for example the magnetic transfer apparatus shown in FIG. 4 can be used. The close-contact member 209, in which the lubricating layer surface of the medium for transfer 200 and the magnetic pattern surface of the transfer master disc 214 are brought into close contact, is fixed on a spindle 400. Through operation of the driving portion 404 on which are mounted magnets 402, the magnets 402 are arranged at a fixed interval with respect to the close-contact member 209. Next, a magnetic field is generated, and by rotating the spindle 400, the desired magnetic pattern is transferred onto the entire surface of the medium for transfer 200. Thereafter the transfer master disc 214 and medium for transfer 200 are separated, and a medium for transfer with transfer completed is obtained.

Figure 5:
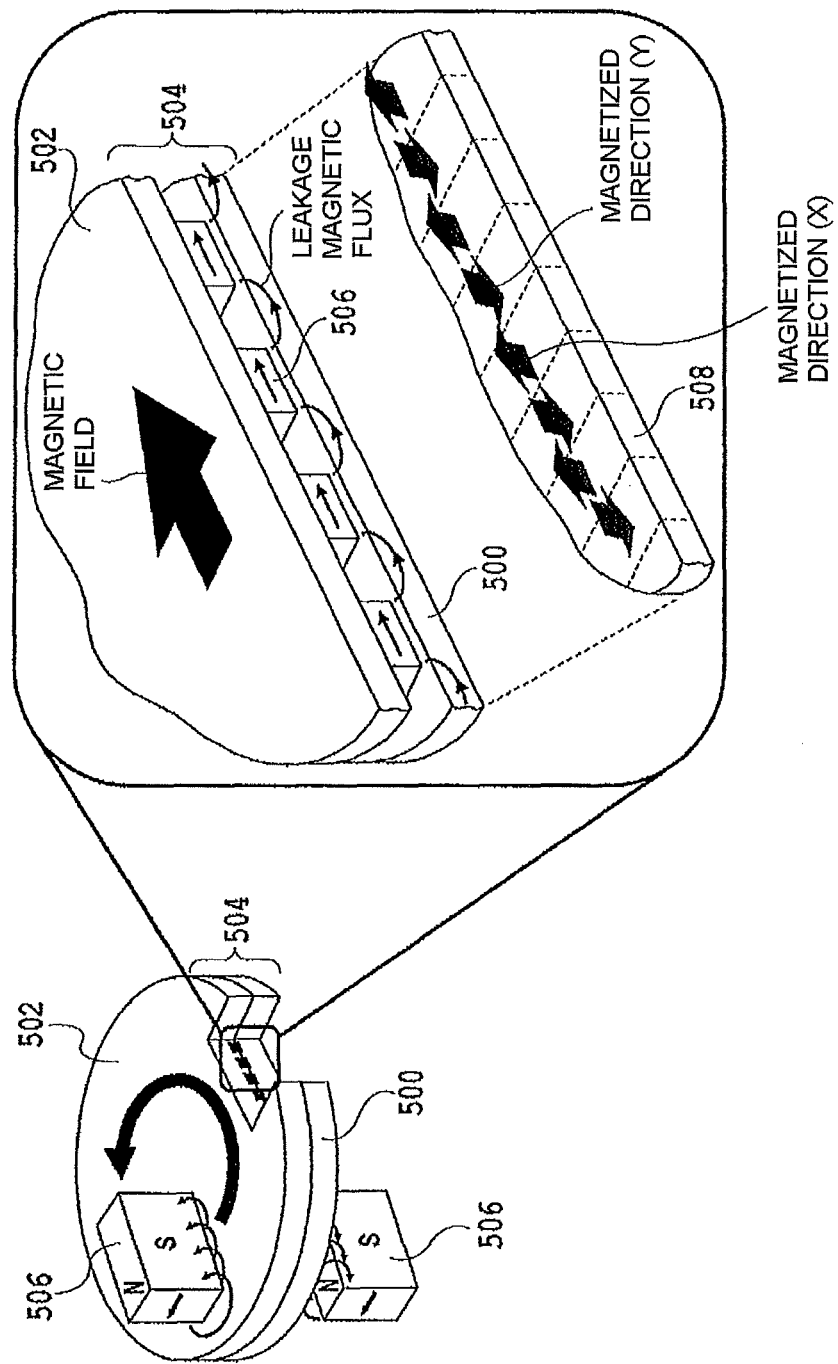
FIG. 5 shows an edge transfer method used in a transfer process of this invention.

As a method of transferring a magnetic pattern to a medium for transfer 200, for example an edge transfer method or a bit transfer method can be used. FIG. 5 schematically illustrates an edge transfer method, and FIGS. 7A and 7B schematically illustrate a bit transfer method.

First, the edge transfer method is explained, referring to FIG. 5.

Figure 6:
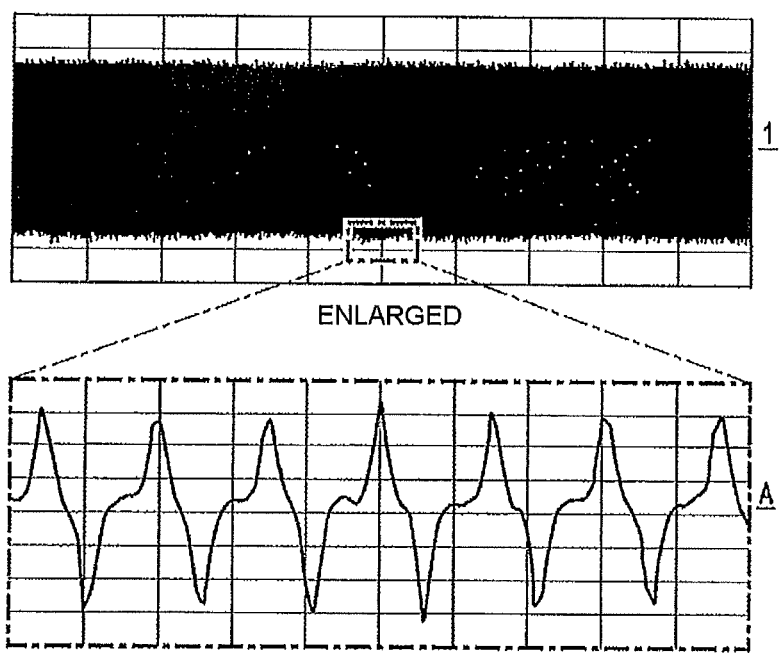
FIG. 6 shows magnetic signals transferred to a medium for transfer.

As shown in FIG. 5, in the edge transfer method, magnets 506 are used to apply a magnetic field to the close-contact member 504, in which the medium for transfer 500 and the transfer master disc 502 are brought into close contact, so as to be parallel to the close-contact surface. A fine shape pattern 506 of a soft magnetic material, corresponding to the transfer information, is provided on the transfer master disc 502. In portions on the transfer master disc 502 without the fine shape pattern 506, leakage magnetic flux enters on the side of the medium for transfer 500, and the magnetic layer of the medium for transfer 500 is magnetized. By this means, magnetic signals are transferred according to the fine shape pattern of the transfer master disc 502, and a medium for transfer 508, in which transfer is completed, can be obtained. FIG. 6 is a summary diagram showing magnetic signals transferred to the medium for transfer 500.

Figure 7A:
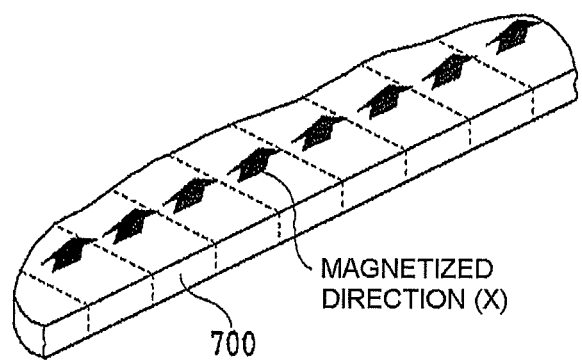
FIGS. 7A and 7B shows a bit transfer method used in a transfer process of this invention.
Figure 7B:
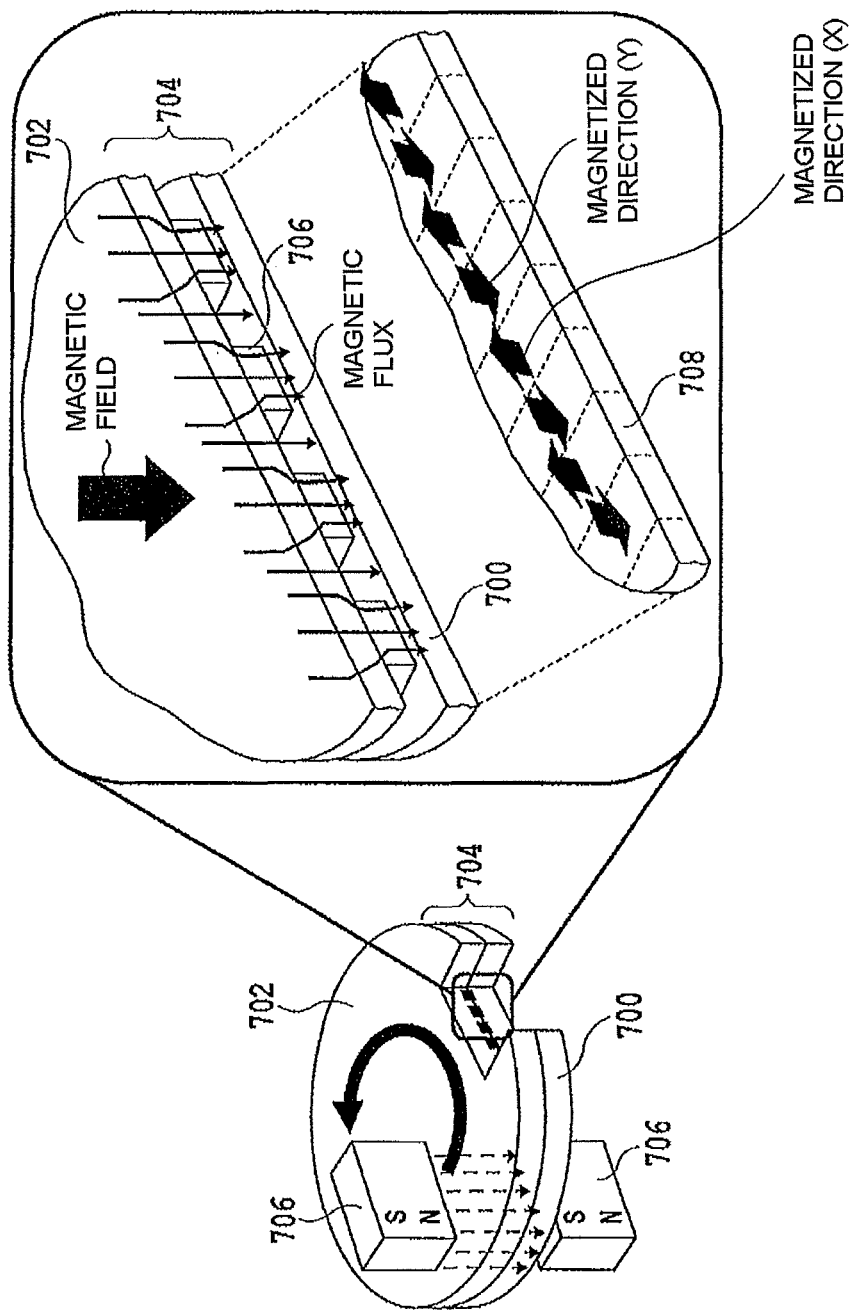

Next, the bit transfer method is explained referring to FIGS. 7A and 7B.

As shown in FIG. 7A, in the bit transfer method a magnetic field is applied in the direction perpendicular to the surface of the medium for transfer 700 prior to transfer to the medium for transfer 700, and the medium for transfer 700 is magnetized in a single direction (the X direction) in advance. Then, as shown in FIG. 7B, when the medium for transfer 700 magnetized in the X direction is brought into close contact with a transfer master disc 702, a magnetic field is applied to the close-contact member 704 in the direction perpendicular to the close-contact surface, i.e., in the Y direction that is opposite to the X direction. A fine shape pattern 706 of a soft magnetic material is provided on the transfer master disc 702.

In portions on the transfer master disc 702 where the fine shape pattern 706 is not formed, a large quantity of magnetic flux is transmitted, so that the member for transfer 700 is magnetized in the direction (the Y direction) opposite to the direction of the previous magnetization (the X direction). On the other hand, in portions in which the fine shape pattern 706 does exist, there is hardly any transmission of magnetic flux, so that the magnetized direction of the medium for transfer 708 after transfer completion remains the same as the direction of previous magnetization of the medium for transfer 700 (the X direction). As a result, magnetic signals are transferred along the fine shape pattern 706 of the transfer master disc 702, and a medium for transfer 708 with transfer completed can be obtained.

In the above, two methods for transferring a magnetic pattern to a medium for transfer were explained. Fine shape patterns of a soft magnetic material on a transfer master disc used in both methods may be formed such that the soft magnetic material forms protrusions on the main surface of the transfer master disc, or may be formed such that the soft magnetic material is embedded in depressions formed in the main surface of the transfer master disc.

Next, a process of flattening the surface of the lubricating layer of a medium for transfer to which transfer has been performed using process 2) is explained.

3) Process of Flattening the Lubricating Layer Surface of a Medium for Transfer after Transfer is Completed (FIGS. 2C and 2D)

Process 3) is a process of flattening the surface of the lubricating layer of the medium for transfer after transfer has been performed in the above process 2). In order to flatten the surface of the lubricating layer of the medium for transfer, means of wiping of the lubricating layer surface using a member without a cutting effect, or means of heating the surface of the lubricating layer of the medium for transfer after transfer, is used. In this Specification, flattening of the surface of a lubricating layer means distributing the lubricant forming the lubricating layer uniformly across the entire protective layer surface.

First, means of wiping the surface of the lubricating layer using a member without a cutting effect is explained, referring to FIG. 2C.

A) Means of Wiping the Surface of the Lubricating Layer Using a Member without a Cutting Effect (FIG. 2C)

FIG. 2C is a summary diagram used to explain wiping of the surface of a medium for transfer 210 onto which transfer has been completed. As shown in FIG. 2C, wiping is performed by using a wiping apparatus, provided with a wiping member 218 and a pressing member 216, to wipe the surface of the lubricating layer 209 of the medium for transfer 210 for which transfer was performed in the above process 2).

Figure 8A:
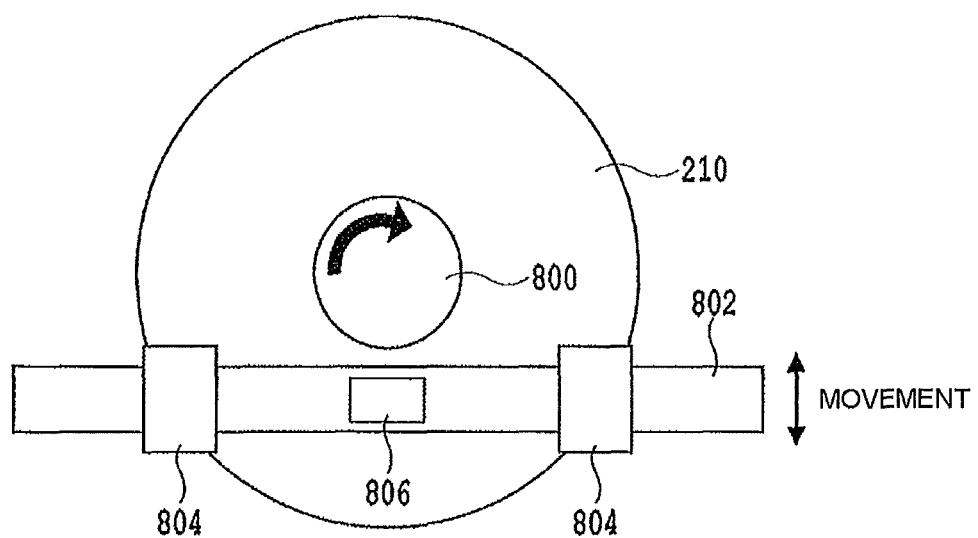
FIGS. 8A and 8B show a flattening process of this invention by wiping the surface of the lubricating layer.
Figure 8B:
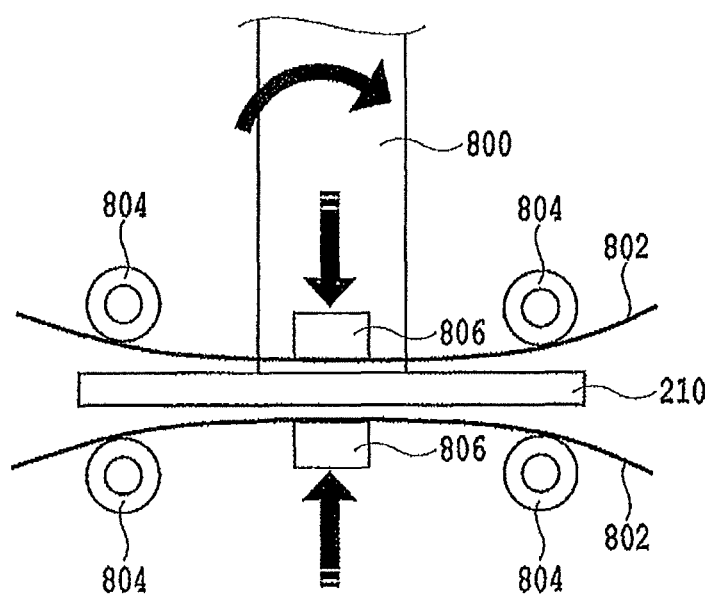

FIGS. 8A and 8B show in detail a method of wiping the surface of the lubricating layer of the medium for transfer 210.

FIGS. 8A and 8B are a schematic diagram showing the method of wiping the transfer-completed medium 210 using the wiping apparatus provided with a wiping member 802, pressing member 806, spindle 800, and roller 804. FIG. 8A is a plane view showing the state of wiping the transfer-completed medium 210, and FIG. 8B is a side view showing this state.

As shown in FIG. 8A, the transfer-completed medium 210 is fixed on the spindle 800, and the spindle 800 is rotated at a prescribed speed. Next, the wiping member 802 is pressed with a constant surface pressure, by the pressing member 806, onto the surface of the lubricating layer of the transfer-completed medium 210, to wipe the surface of the lubricating layer of the transfer-completed medium 210. In order to wipe the entire surface of the lubricating layer of the transfer-completed medium 210, while pressing the wiping member 802 against the surface of the lubricating layer, the wiping member 802 is moved at a prescribed speed in a horizontal direction with respect to the pressing surface.

As shown in FIG. 8B, to press the wiping member 802 against the surface of the lubricating layer of the medium for transfer 210, the pressing member 806 is moved such that the lubricating layer surface and the pressing surface of the wiping member 802 are parallel.

Further, the roller 804 may be moved as appropriate in order to replace a used pressing surface of the wiping member 802 with a new pressing surface, as degradation occurs due to use of the wiping member 802.

And, in order to end wiping, the pressing member 806 is moved in the direction perpendicular to the pressing surface, and the wiping member 802 is removed from the medium for transfer 210.

The rotation speed of the spindle 800 differs depending on the material of the wiping member 802 and similar. A speed at which friction does not occur at the contact surface between the lubricating layer of the medium for transfer 210 and the wiping member 802, for example a speed in the range 300 to 3000 rpm, is preferable.

It is preferable that the wiping member 802 is pressed against the surface of the lubricating layer of the medium for transfer 210 by a surface pressure such that the surface of the lubricating layer of the medium for transfer 210 is not damaged, for example by a surface pressure in the range 5 to 150 kPa.

It is preferable that the wiping member 802 pressed against the surface of the lubricating layer of the medium for transfer 210 moves at a speed at which the surface of the lubricating layer of the medium for transfer 210 is not damaged, for example at a speed in the range 1 to 20 mm/second.

It is preferable that the pressing member 806 comprise an elastic material, such as urethane, rubber or similar, so as to enable uniform pressing against the lubricating layer surface.

As the wiping member 802, a member without a cutting effect is used so as not to damage the surface of the lubricating layer of the medium for transfer 210.

With respect to having a small contact pressure for burnishing tape with cutting ability by means of hard and sharp abrasive particles, it is preferable that the member without a cutting effect comprises woven cloth or unwoven cloth. As fibers comprised by the woven cloth or unwoven cloth, it is preferable to use synthetic fibers of nylon or polyester, having high strength such that the fibers themselves are not cut to generate dust. For example, as a member without a cutting effect comprising woven cloth or unwoven cloth, woven cloth comprising synthetic fibers of 0.3 denier or lower described in Japanese Patent Application Laid-open No. 3-268223 can be used.

Further, from the standpoint of a low friction force, it is preferable that the member without a cutting effect comprise a wiping film in which minute particles are bonded by a bonding agent onto a film base. A wiping film can for example be manufactured, as described in Japanese Patent Application Laid-open No. 2002-224966, by combining and dispersing minute particles, a bonding agent, and a solvent to prepare an application solution, and applying this application solution to the surface of a base film and drying.

A film base may be, for example, polyethylene terephthalate or another polyester system resin, a high-density polyethylene or other polyolefin system resin, polystyrene, polyvinyl chloride, polyvinylidene chloride, polyvinyl alcohol, ethylene-vinyl alcohol copolymer, acrylic resin having as the main component a polyacrylonitrile, polyamide, acrylic acid ester, or methacrylic ester, polyacetal, cellulose triacetate, or a similar material.

Minute particles may comprise, for example, a polymethacrylic ester, polystyrene, polyolefin, phenol resin, epoxy resin, acrylonitrile-butadiene-styrene resin, high-density polyethylene resin, urea resin, polyester resin, polyvinyl chloride, polyamide, polycarbonate, or similar material. Further, spherical glass, spherical ceramics, or minute particles of other inorganic materials may be intermixed. However, it is important that minute particles not contain abrasive particles comprising aluminum oxide, diamond, or cerium oxide.

It is preferable that the shape of the minute particles be spherical, in order that there be no cutting effect. It is preferable that the average particle diameter be 0.01 to 100 μm. And, it is preferable that the minute particles have a Rockwell hardness of M10 to M130.

The bonding agent may for example comprise a thermoplastic resin, thermosetting resin, reactive resin, electron beam-hardening resin, ultraviolet ray-hardening resin, visible light-hardening resin, or a similar material. For example, a polyester, vinyl chloride, or similar can be used.

The above-described wiping can be performed in a short time, from several seconds to several tens of seconds, without damaging the surface of the lubricating layer, which enables continuous treatment of media for transfer. As a result, productivity of magnetic recording media can be improved.

Next, another means of flattening the surface of the lubricating layer of a medium for transfer, i.e., means of heating the surface of the lubricating layer of the medium for transfer after transfer is completed, is explained referring to FIG. 2D.

B) Means of Heating the Surface of the Lubricating Layer of Medium for Transfer for which Transfer is Completed (FIG. 2D)

FIG. 2D is a summary diagram used to explain heating of the surface of a medium 210 for which transfer is completed. As shown in FIG. 2D, heating is performed by using a heating apparatus to heat the surface of the lubricating layer 209 of the medium 210 for which transfer was performed in the above process 2). Thereafter the heated medium is cooled under prescribed conditions, and a magnetic recording medium is obtained.

As the heating method, heating can be performed by placing the transfer-completed medium 210 in the heating apparatus set to a prescribed temperature for a fixed length of time. Any other method, however, can be applied so long as the lubricating layer 209 of the transfer-completed medium 210 becomes fluid as a result of heating, and the surface is flattened.

Heating conditions differ depending on the materials comprised by the medium for the transfer-completed medium 210 and similar. For example, when a perfluoro polyether system liquid lubricant is used, the transfer-completed medium 210 can be placed on the heating apparatus at 50 to 200° C. for from 10 minutes to 2 hours.

As the heating apparatus, for example a furnace or similar can be applied.

Conditions for cooling after heating differ depending on the materials comprised by the medium for transfer 210 for which transfer is completed and similar. For example, when a perfluoro polyether system liquid lubricant is used, the medium for transfer 210 for which transfer is completed can be left at room temperature for from 10 minutes to 2 hours.

The heating explained above enables treatment of a large quantity of media for transfer all at once without damaging the lubricating layer surface. As a result, productivity of magnetic recording media can be improved.

In the above, the process 3) of flattening the surface of the lubricating layer of a transfer-completed medium was explained. After this process, a process of burnishing the medium for transfer may be further included. This process is explained below.

[Process of Burnishing the Medium for Transfer]

This process is a process in which, by burnishing the medium for transfer the surface of the lubricating layer of which has been flattened in the above process 3), minute protrusions and dust existing on the surface of the lubricating layer are removed. Burnishing performed in this process can apply a method used in the manufacture of conventional magnetic recording media.

For example, in burnishing, a burnishing head or a burnishing tape mounted on a burnishing apparatus can be used to remove minute protrusions and dust existing on the surface of the lubricating layer.

A burnishing head comprises for example $Al_2O_3$—TiC or a similar material.

Burnishing tape may be formed, for example, by using a bonding agent to bond abrasive particles to a film base. Further, as in methods of the prior art, a burnishing tape can be manufactured by mixing and dispersing abrasive particles, a bonding agent, and a solvent to prepare an application solution, and then applying this application solution to the surface of a base film and drying.

The film base may comprise, for example, polyethylene terephthalate resin or a similar material.

The abrasive particles may comprise, for example, aluminum oxide, diamond, cerium oxide, or a similar material.

The bonding agent may for example comprise a saturated polyester resin or a similar material.

There are concerns that the above burnishing process, if performed on a medium for transfer the lubricating layer surface of which has not been flattened, may cause damage to the medium for transfer, but when performed on a medium for transfer the lubricating layer surface of which has been flattened in the above process 3), minute protrusions and dust on the medium can be removed without damaging the medium for transfer.

As explained above, a method of manufacturing a magnetic recording medium of this invention enables manufacture of a high-recording-density magnetic recording medium with excellent surface smoothness. Hence magnetic recording media with high recording densities and which enable stable flight of magnetic heads can be provided with high manufacturing yields.

EXAMPLES

Below, examples are used to explain methods of manufacturing magnetic recording media of this invention in further detail. The following examples are exemplary, and are not intended to limit the invention.

Example 1

(Formation of Medium for Transfer)

After using a sputtering method to form a magnetic layer of CoCrPt—$SiO_2$ to a thickness of approximately 100 nm on a disc-shape glass substrate of outer diameter 65 mm, inner diameter 20 mm, and thickness 0.635 mm, a protective layer comprising carbon was formed by a CVD method to a thickness of 2.8 nm, as shown in FIG. 2A. Next, the liquid lubricant Z-Tetraol (manufactured by Solvay Solexis) was applied by a dipping method onto the protective layer to a thickness of 1.2 nm and was dried to form a lubricating layer, and a medium for transfer was obtained. The protective layer thickness was 2.8 nm and the lubricating layer thickness was 1.2 nm; the surface roughness Ra of the medium for transfer was 0.31 nm.

(Inspection of Surface Smoothness)

As shown in FIG. 3A, media for transfer were subjected to glide test using a glide testing apparatus with the head flying height set to 6.5 nm, and 100 media for transfer which passed this test were prepared. The tested media for transfer were used as media for transfer to perform magnetic transfer, and the following treatment was performed one medium at a time.

(Magnetic Transfer)

As shown in FIG. 2B, the transfer master disc and medium for transfer were brought into very close contact, and a magnetic transfer apparatus was used to perform magnetic transfer. Thereafter the transfer master disc and medium for transfer were separated, and a medium for transfer with transfer completed was obtained.

(Flattening of Lubricating Layer Surface)

Next, as shown in FIG. 8A, the transfer-completed medium was completed was fixed on a spindle, and the spindle was rotated at a speed of 1000 rpm. Then, a woven cloth comprising 0.15 denier polyester fibers was pressed, as the wiping member, against the surface of the lubricating layer of the medium for transfer by a pressing member comprising rubber, at a surface pressure of 12.7 kPa (0.13 kgf/cm$^2$). Then, the wiping member was moved over 5 seconds in the horizontal direction with respect to the pressing surface, and by performing wiping of the entire lubricating layer surface of the medium, a magnetic recording medium was obtained.

(Evaluation of Magnetic Recording Medium)

Magnetic recording media thus manufactured was subjected to glide tests and signal read/write tests using magnetic recording media characteristic testing equipment (manufactured by Hitachi High-Technologies Corp.).

Glide tests were executed with the glide testing head flying height set to 6.5 nm. In these tests, when no protrusions could be detected existing on the surface of a magnetic recording medium, the medium was regarded as passing the test.

Table 1 shows results for the number of media passing each test.

Example 2

In this example, as the wiping member in the (flattening of the lubricating layer surface) of Example 1, a film obtained by using a saturated polyester resin bonding agent to bond minute particles comprising an acrylic resin onto a film base comprising polyethylene terephthalate was employed, and by pressing at a surface pressure of 24.5 kPa (0.25 kgf/cm$^2$), magnetic recording media was manufactured. This magnetic recording media was subjected to glide tests and signal read/write tests. Table 1 shows results for the number of media passing the tests.

Example 3

In this example, in place of the wiping of the medium for transfer after transfer in the (flattening of the lubricating layer surface) of Example 1, the medium for transfer was inserted into a furnace at 120° C. and was left for 30 minutes, and the medium for transfer was then removed from the furnace and was left for 30 minutes at room temperature, and magnetic recording media was obtained. This magnetic recording media was subjected to glide tests and signal read/write tests. Table 1 shows results for the number of media passing the tests.

Example 4

In this example, the medium for transfer was formed under the same conditions as in Example 1, and then, without executing glide tests, 100 of the media for transfer thus formed were, one at a time, subjected to magnetic transfer similarly to Example 1, and wiping was performed. Then, the wiping member used in the wiping was replaced with a burnishing member, and the burnishing member was pressed with a surface pressure of 12.7 kPa (0.13 kgf/cm$^2$) onto the lubricating layer surface by a pressing member. Then, the wiping member was moved over 5 seconds in a horizontal direction with respect to the pressing surface, and wiping was performed over the entire surface of the lubricating layer of the medium, to obtain magnetic recording media. These magnetic recording media were also subjected to glide tests and signal read/write tests. Table 1 shows results for the number of media passing the tests.

Example 5

In this example, the medium for transfer was formed under the same conditions as in Example 1, and then, without executing glide tests, 100 of the media for transfer thus formed were, one at a time, subjected to magnetic transfer similarly to Example 1, and wiping was performed to obtain magnetic recording media. These magnetic recording media were also subjected to glide tests and signal read/write tests. Table 1 shows results for the number of media passing the tests.

Comparative Example 1

In this comparative example, the medium for transfer was formed under the same conditions as in Example 1, and then, without executing glide tests, 100 of the media for transfer thus formed were, one at a time, subjected to magnetic transfer similarly to Example 1. Then, the media for transfer with transfer completed were fixed on a spindle, the burnishing head flying height was set to 6.5 nm, the spindle was rotated at a speed of 7200 rpm, and the entire surface of the media for transfer with transfer completed was burnished. The burnishing head comprised $Al_2O_3$—TiC material.

The magnetic recording media obtained by burnishing were subjected to glide tests and signal read/write tests. Table 1 shows results for the number of media passing the tests.

Comparative Example 2

In this comparative example, in place of the burnishing head in Comparative Example 1, burnishing was performed using burnishing tape.

Burnishing using burnishing tape was performed by fixing the medium for transfer with transfer completed on a spindle, rotating the spindle at a speed of 1000 rpm, and pressing against the surface of the lubricating layer of the medium for transfer with transfer completed, at a surface pressure of 12.7 kPa (0.13 kgf/cm$^2$) by a pressing member, a lapping film obtained by using a bonding agent comprising a saturated polyester resin to bond minute particles comprising an acrylic resin onto a film base comprising polyethylene terephthalate. Further, the lapping film was moved over 5 seconds in a horizontal direction with respect to the pressing surface, and burnishing was performed over the entire lubricating layer surface of the medium, to obtain magnetic recording media.

This magnetic recording media was subjected to glide tests and signal read/write tests. Table 1 shows results for the number of media passing the tests.

Comparative Example 3

This comparative example is the same as the method described in Example 1, except that the flattening of the surface of the lubricating layer in Example 1 was not performed.

This magnetic recording media was subjected to glide tests and signal read/write tests. Table 1 shows results for the number of media passing the tests.

Comparative Example 4

In this comparative example, in place of the medium for transfer used in Comparative Example 2, a medium for transfer having a protective layer of thickness 3.2 nm and lubricating layer of thickness 1.7 nm and with a surface roughness Ra of 0.52 nm, was used. Except for this, comparative Example 4 is the same as the method described in Comparative Example 2.

This magnetic recording media was subjected to glide tests and signal read/write tests. Table 1 shows results for the number of media passing the tests.

TABLE 1

| | The number of media passing glide tests and signal read/write tests | | | | | |
|---|---|---|---|---|---|---|
| | Glide tests (number passing) | Signal read/write tests (number passing) | Results of analysis of non-passing media*[1] | Shape at time of formation of medium for transfer*[2] | Glide tests before magnetic transfer*[3] | Surface treatment of medium for transfer*[4] |
| Example 1 | 94 | 94 | — | A | ○ | wiping |
| Example 2 | 96 | 96 | — | A | ○ | wiping |
| Example 3 | 97 | 94 | — | A | ○ | heating |
| Example 4 | 97 | 95 | — | A | — | wiping + tape burnishing |
| Example 5 | 93 | 90 | *Protrusion detection | A | — | wiping |
| Comparative Example 1 | 82 | 37 | *Scratch detection | A | — | head burnishing |

TABLE 1-continued

The number of media passing glide tests and signal read/write tests

| | Glide tests (number passing) | Signal read/write tests (number passing) | Results of analysis of non-passing media*[1] | Shape at time of formation of medium for transfer*[2] | Glide tests before magnetic transfer*[3] | Surface treatment of medium for transfer*[4] |
|---|---|---|---|---|---|---|
| Comparative Example 2 | 76 | 43 | *Protrusion detection in vicinity of scratches *Scratch detection *Protrusion detection in vicinity of scratches | A | — | tape burnishing |
| Comparative Example 3 | 89 | 62 | *Head flight instability | A | ○ | — |
| Comparative Example 4 | 96 | 94 | — | B | — | tape burnishing |

*[1]"—": Not executed
*[2]"A": Protective layer thickness 2.8 nm, lubricating layer thickness 1.2 nm, surface roughness Ra 0.31 nm
"B": Protective layer thickness 3.2 nm, lubricating layer thickness 1.7 nm, surface roughness Ra 0.52 nm
*[3]"○": Executed "—": Not executed
*[4]"—": Not executed As shown in Table 1, in the magnetic recording media of Examples 1 to 5, in which wiping or heating was performed after magnetic transfer, the numbers of media passing the signal read/write test, which was the final test, were greater compared with Comparative Examples 1 and 2 in which conventional burnishing was performed.

In particular, results for Examples 1 to 3, in which glide tests were performed before magnetic transfer, and for Example 4, in which tape burnishing was performed after wiping following magnetic transfer, were better than for Example 5, in which only wiping was performed. Upon analyzing non-passing media of Example 5, large protrusions, which would exert an effect on the flight of magnetic heads, were detected. For this reason, it is preferable that either surface smoothness tests be performed prior to magnetic transfer, or that burnishing be performed after wiping.

On the other hand, in Comparative Examples 1 and 2 in which burnishing was performed, upon analyzing non-passing media minute scratches were detected, and moreover burr protrusions were detected along the scratches. It was found that burr protrusions are a cause of a reduced number of media passing glide tests, and that scratches are a cause of a reduced number of media passing signal read/write tests.

In Comparative Example 3, in which surface treatment of the lubricating layer of the medium for transfer was not performed, the number of media passing glide tests and signal read/write tests after magnetic transfer was small. As a result of analysis of non-passing media, roughness was observed in the lubricating layer surface, and it was found that media could not pass tests because magnetic heads could not fly with stability.

Compared with Comparative Example 4, in Comparative Example 2, the number of media passing tests was small. From this it is clear that if conventional techniques are applied to magnetic recording media with smaller surface roughness, and with a thinner protective layer and lubricating layer for smaller magnetic spacing, there is an adverse effect on manufacturing yield. Hence it was found that in order to manufacture such magnetic recording media with smaller surface roughness, and with a thinner protective layer and lubricating layer, the use of means for flattening the surface of the lubricating layer by a method of this invention is effective.

Next, results of more detailed studies on the effectiveness of methods of manufacturing magnetic recording media of this invention when manufacturing magnetic recording media with smaller surface roughness, and thinner protective layers and lubricating layers, are described.

Examples 6 to 11

After using a sputtering method to form a magnetic layer of CoCrPt—$SiO_2$ to a thickness of approximately 100 nm on a disc-shape glass substrate of outer diameter 65 mm, inner diameter 20 mm, and thickness 0.635 mm, a protective layer comprising carbon was formed by a CVD method to a thickness in the range of 2.0 nm to 3.2 nm, as shown in FIG. 2A. Next, the liquid lubricant Z-Tetraol (manufactured by Solvay Solexis) was applied by a dipping method onto the protective layer to a thickness in the range of 0.7 nm to 1.7 nm and was dried to form a lubricating layer, and a medium for transfer was obtained. The surface roughness Ra of the medium for transfer was from 0.22 nm to 0.52 nm. Table 2 shows the thicknesses of the protective layer and lubricating layer, and the surface roughness Ra, for each of the samples fabricated.

Next, ten samples of medium for transfer for each example were fabricated, and by performing, one medium at a time, the magnetic transfer and lubricating layer surface flattening described in Example 1, magnetic recording media were obtained. In Examples 6 to 11, glide tests before magnetic transfer were not performed.

The magnetic recording media thus manufactured were subjected to glide tests and signal read/write tests similarly to Example 1. Table 2 shows results for the number of media passing the tests.

Comparative Examples 5 to 18

After using a sputtering method to form a magnetic layer of CoCrPt—$SiO_2$ to a thickness of approximately 100 nm on a disc-shape glass substrate of outer diameter 65 mm, inner diameter 20 mm, and thickness 0.635 mm, a protective layer comprising carbon was formed by a CVD method to a thickness in the range of 2.0 nm to 4.0 nm, as shown in FIG. 2A. Next, the liquid lubricant Z-Tetraol (manufactured by Solvay Solexis) was applied by a dipping method onto the protective layer to a thickness in the range of 0.7 nm to 2.5 nm and was dried to form a lubricating layer, and a medium for transfer was obtained. The surface roughness Ra of the media for transfer was from 0.22 nm to 0.60 nm. Table 2 shows the thicknesses of the protective layer and lubricating layer, and the surface roughness Ra, for each of the samples fabricated.

Next, ten samples of media for transfer were fabricated for each of the comparative examples, and, one at a time, magnetic transfer and burnishing were performed as described in Comparative Example 2, to obtain magnetic recording media. Glide tests before magnetic transfer were not performed in any of the Comparative Examples 5 to 18.

The magnetic recording media manufactured in this way were subjected to glide tests and signal read/write tests similarly to Example 1. Table 2 shows results for the number of media passing the tests.

TABLE 2

The number of media passing glide tests and signal read/write tests

| | Protective layer thickness (nm) | Lubricating layer thickness (nm) | Surface roughness Ra (nm) | Glide tests (number passing) | Signal read/write tests (number passing) |
|---|---|---|---|---|---|
| Example 6 | 2.0 | 1.7 | 0.52 | 10 | 10 |
| Example 7 | 2.8 | 1.7 | 0.52 | 10 | 10 |
| Example 8 | 3.2 | 0.7 | 0.52 | 9 | 9 |
| Example 9 | 3.2 | 1.2 | 0.52 | 10 | 10 |
| Example 10 | 3.2 | 1.7 | 0.22 | 10 | 9 |
| Example 11 | 3.2 | 1.7 | 0.31 | 10 | 10 |
| Comparative Example 5 | 2.0 | 1.7 | 0.52 | 7 | 4 |
| Comparative Example 6 | 2.8 | 1.7 | 0.52 | 8 | 3 |
| Comparative Example 7 | 3.2 | 1.7 | 0.52 | 10 | 10 |
| Comparative Example 8 | 3.5 | 1.7 | 0.52 | 10 | 9 |
| Comparative Example 9 | 4.0 | 1.7 | 0.52 | 10 | 10 |
| Comparative Example 10 | 3.2 | 0.7 | 0.52 | 2 | 0 |
| Comparative Example 11 | 3.2 | 1.2 | 0.52 | 5 | 2 |
| Comparative Example 12 | 3.2 | 2.2 | 0.52 | 10 | 10 |
| Comparative Example 13 | 3.2 | 2.5 | 0.52 | 10 | 10 |
| Comparative Example 14 | 3.2 | 1.7 | 0.22 | 7 | 3 |
| Comparative Example 15 | 3.2 | 1.7 | 0.31 | 6 | 4 |
| Comparative Example 16 | 3.2 | 1.7 | 0.38 | 8 | 7 |
| Comparative Example 17 | 3.2 | 1.7 | 0.47 | 8 | 7 |
| Comparative Example 18 | 3.2 | 1.7 | 0.60 | 9 | 9 |

As is seen from Table 2, as a result of changing the thickness of the protective film in Comparative Examples 5 to 9, the number of media passing the tests declined beginning from a thickness of approximately 3.0 nm. Further, as a result of changing the thickness of the lubricating layer in Comparative Example 7 and Comparative Examples 10 to 13, the number of media passing the tests declined beginning from a thickness of approximately 1.5 nm. And, as a result of changing the surface roughness Ra of Comparative Example 7 and Comparative Examples 14 to 18, the number of media passing the tests declined beginning from an Ra of approximately 0.5 nm.

On the other hand, in the cases of magnetic recording media manufactured according to a method of this invention, all ten media passed the tests even when the protective film thickness was 3.0 nm or less, as in Examples 6 and 7. Further, even when the lubricating layer thickness was 1.5 nm or less as in Examples 8 and 9, the tests were generally passed. And, even when the surface roughness Ra was 0.5 or less as in Examples 10 and 11, the tests were generally passed.

Hence it was found that this invention is particularly effective in the manufacture of magnetic recording media with a protective film thickness of 3.0 nm or less, a lubricating layer thickness of 1.5 nm or less, and a surface roughness Ra of 0.5 nm or less. Hence in a method of manufacturing magnetic recording media including a magnetic transfer process, when manufacturing magnetic recording media with a small surface roughness and thin protective layer and lubricating layer, by using a method of this invention, magnetic recording media with excellent surface smoothness can be manufactured. As a result, magnetic recording media enabling stable magnetic head flight can be provided.

What is claimed is:

1. A method of manufacturing a magnetic recording medium, comprising the steps of:
    1) layering a magnetic layer, a protective layer, and a lubricating layer in that order on a substrate, and forming a medium including the substrate, magnetic layer, protective layer and lubricating layer;
    2) transferring a magnetic pattern to the medium; and
    3) flattening a surface of the lubricating layer of the medium when the magnetic pattern transferring is completed,
    wherein the flattening step includes wiping the surface of the lubricating layer using a member without a cutting effect, and
    wherein the flattening step is performed only after the step 2), without being performed before the step 2).

2. The method of claim 1, wherein the member without a cutting effect comprises woven cloth or unwoven cloth.

3. The method of claim 1, wherein the member without a cutting effect comprises a wiping film in which particles are bonded onto a film base by a bonding agent.

4. The method of claim 1, further comprising a step of inspecting a surface smoothness of the medium between step 1) and step 2).

5. The method of claim 4, wherein the inspecting step is performed by a glide test.

6. The method of claim 1, further comprising a step of burnishing the medium after step 3), without being performed before the step 2), wherein the member used in the flattening step is formed of a non-abrasive material.

7. The method of claim 1, wherein the protective layer of the medium formed in step 1) has a thickness of 3.0 nm or less.

8. The method of claim 1, wherein the lubricating layer of the medium formed in step 1) has a thickness of 1.5 nm or less.

9. The method of claim 1, wherein the medium formed in step 1) has a surface roughness Ra of 0.5 nm or less.

10. A method of manufacturing a magnetic recording medium, comprising the steps of:
    1) layering a magnetic layer, a protective layer, and a lubricating layer in that order on a substrate, and forming a medium including the substrate, magnetic layer, protective layer and lubricating layer;
    2) transferring a magnetic pattern to the medium; and 3) flattening a surface of the lubricating layer of the medium when the magnetic pattern transferring is completed, wherein the flattening step includes heating the surface of the lubricating layer, and wherein the flattening step is performed only after the step 2), without being performed before the step 2).

11. The method of claim 10, further comprising a step of inspecting a surface smoothness of the medium between step 1) and step 2).

12. The method of claim 11, wherein the inspecting step is performed by a glide test.

13. The method of claim 10, further comprising a step of burnishing the medium after step 3), without being performed before the step 2), wherein the member used in the flattening step is formed of a non-abrasive material.

14. The method of claim 10, wherein the protective layer of the medium formed in step 1) has a thickness of 3.0 nm or less.

15. The method of claim 10, wherein the lubricating layer of the medium formed in step 1) has a thickness of 1.5 nm or less.

16. The method of claim 10, wherein the medium formed in step 1) has a surface roughness Ra of 0.5 nm or less.

17. The method of claim 1, further comprising a step of performing a glide test to inspect a surface smoothness of the medium, wherein the glide test is performed only after the step 3), without being performed before the step 2).

18. The method of claim 10, further comprising a step of performing a glide test to inspect a surface smoothness of the medium, wherein the glide test is performed only after the step 3), without being performed before the step 2).

19. The method of claim 10, wherein the heating of the surface of the lubricating layer includes inserting the medium into a furnace and leaving the medium in the furnace.

* * * * *